United States Patent
Chen

(10) Patent No.: US 10,221,341 B2
(45) Date of Patent: Mar. 5, 2019

(54) WATER-BORNE ADHESIVES

(75) Inventor: Mai Chen, Chicago, IL (US)

(73) Assignee: Rohm and Haas Company, Collegeville, PA (US)

(*) Notice: Subject to any disclaimer, the term of this patent is extended or adjusted under 35 U.S.C. 154(b) by 713 days.

(21) Appl. No.: 14/116,150

(22) PCT Filed: May 14, 2012

(86) PCT No.: PCT/US2012/037741
§ 371 (c)(1),
(2), (4) Date: Nov. 7, 2013

(87) PCT Pub. No.: WO2012/158601
PCT Pub. Date: Nov. 22, 2012

(65) Prior Publication Data
US 2014/0093740 A1  Apr. 3, 2014

Related U.S. Application Data

(60) Provisional application No. 61/485,893, filed on May 13, 2011.

(51) Int. Cl.
| | | |
|---|---|---|
| C09J 133/08 | (2006.01) | |
| C09J 133/06 | (2006.01) | |
| C09J 133/24 | (2006.01) | |
| C08F 220/18 | (2006.01) | |
| C08F 212/08 | (2006.01) | |
| C08F 220/56 | (2006.01) | |

(52) U.S. Cl.
CPC ............ *C09J 133/08* (2013.01); *C09J 133/06* (2013.01); *C09J 133/24* (2013.01); *Y10T 428/3175* (2015.04)

(58) Field of Classification Search
CPC .............................. C09J 133/08; C09J 199/06
See application file for complete search history.

(56) References Cited

U.S. PATENT DOCUMENTS

| | | | | |
|---|---|---|---|---|
| 3,624,020 | A * | 11/1971 | Klebert | C08G 18/10 524/460 |
| 4,529,772 | A * | 7/1985 | Druschke | C09J 133/08 156/327 |
| 5,342,897 | A * | 8/1994 | Franzman | C04B 24/26 525/198 |
| 5,414,041 | A * | 5/1995 | Larson | C08G 18/62 524/589 |
| 5,474,638 | A * | 12/1995 | Kohlhammer | C09J 133/06 156/308.2 |
| 6,281,298 | B1 * | 8/2001 | Papsin, Jr. | B32B 27/00 524/272 |
| 6,607,631 | B1 | 8/2003 | Badejo et al. | |
| 7,267,862 | B1 * | 9/2007 | Burke | B32B 15/08 428/212 |
| 2002/0002232 | A1 | 1/2002 | Sagiv et al. | |
| 2007/0238825 | A1 * | 10/2007 | Takamura | C08F 36/04 524/460 |
| 2009/0029162 | A1 | 1/2009 | Ukei et al. | |
| 2009/0142610 | A1 | 6/2009 | Paschkowski et al. | |

OTHER PUBLICATIONS

Sperling, "Interpenetrating Polymer Networks," Encyclopedia of Polymer Science and Technology, vol. 10, pp. 272-31, (2004).*

* cited by examiner

*Primary Examiner* — Randy P Gulakowski
*Assistant Examiner* — Ha S Nguyen

(57) ABSTRACT

There is provided a method of bonding a first substrate to a second substrate, wherein said method comprises
  (a) applying a layer of a waterborne adhesive composition to a surface of said first substrate, wherein said waterborne adhesive composition comprises one or more vinyl polymer that comprises
    (i) 0 to 0.4% polymerized units of carboxyl functional monomer, by weight based on the weight of said vinyl polymer, and
    (ii) 0.1% to 10% polymerized units of amide monomer, by weight based on the weight of said vinyl polymer,
  (b) drying said layer of a waterborne adhesive composition to remove water, and
  (b) contacting a surface of said second substrate to said layer,
wherein one or both of said first substrate and said second substrate comprises one or more slip agent Also provided is a bonded article made by such a method.

12 Claims, No Drawings

WATER-BORNE ADHESIVES

The following is the background of the invention.

It is often desired to bond two or more substrates together using an adhesive composition in situations in which one or more of the substrates contains a slip agent. For example, a bonded article may be formed by bonding two substrates made of polymer together when one or both of the substrates is made of a polymer that contains one or more fatty amide as a slip agent. Such slip agents are sometimes added to a polymer so that the surface of a substrate made from that polymer will have relatively low coefficient of friction. One problem that arises in such systems is that the slip agent may migrate from the substrate into the adhesive, thereby depleting the amount of slip agent in the substrate and consequently increasing the coefficient of friction of that substrate.

One method that has been used in the past to reduce depletion of slip agent from the substrate has been to incorporate some slip agent into the adhesive composition prior to bonding with the substrate. For example, when the adhesive composition is either a solvent-free adhesive composition or is a composition in which the adhesive is dissolved in an organic solvent, it is often possible to dissolve some slip agent in the adhesive composition. Then, when a layer of the adhesive composition is formed on a surface of a substrate that contains slip agent, the layer of adhesive will also contain some slip agent, and the presence of slip agent in the layer of adhesive composition will reduce the tendency toward depletion of slip agent from the substrate. The substrate will therefore maintain its relatively low coefficient of friction.

It is often desired to use an adhesive composition that is waterborne. Slip agents are not normally soluble in water, and addition of slip agent to a waterborne composition usually results in a mixture that is unacceptable because of phase separation, instability, or other undesirable result of incompatibility of the ingredients. Therefore the method described above for maintaining the coefficient of friction of the substrate by adding slip agent to the adhesive composition would not be effective when the adhesive composition is waterborne.

US Patent Publication 2009/0142610 describes a hotmelt adhesive composition that contains a fatty amide. It is desired to provide an adhesive composition that is waterborne and that does not cause increase of the coefficient of friction in substrates that contain slip agent.

The following is a statement of the invention.

The first aspect of the present invention is a method of bonding a first substrate to a second substrate, wherein said method comprises (a) applying a layer of a waterborne adhesive composition to a surface of said first substrate, wherein said waterborne adhesive composition comprises one or more vinyl polymer that comprises (i) 0 to 0.4% polymerized units of carboxyl functional monomer, by weight based on the weight of said vinyl polymer, and (ii) 0.1% to 10% polymerized units of amide monomer, by weight based on the weight of said vinyl polymer, (b) drying said layer of a waterborne adhesive composition to remove water, and (c) contacting a surface of said second substrate to said layer, wherein one or both of said first substrate and said second substrate comprises one or more slip agent The second aspect of the present invention is a bonded article made by the method of the first aspect of the present invention.

The following is a detailed description of the invention.

As used herein, the following terms have the designated definitions, unless the context clearly indicates otherwise.

A "polymer," as used herein and as defined by F W Billmeyer, JR. in Textbook of Polymer Science, second edition, 1971, is a relatively large molecule made up of the reaction products of smaller chemical repeat units.

Polymer molecular weights can be measured by standard methods such as, for example, size exclusion chromatography (SEC, also called gel permeation chromatography or GPC). Generally, polymers have weight-average molecular weight (Mw) of 1,000 or more. Some polymers are characterized by Mn, the number-average molecular weight.

Some polymers exhibit one or more glass transition temperature (Tg). Tg is determined using differential scanning calorimetry with the midpoint method.

As used herein "weight of polymer" means the dry weight of polymer.

Molecules that can react with each other to form the repeat units of a polymer are known herein as "monomers." Vinyl monomers are monomers that have at least one carbon-carbon double bond that is not part of an aromatic ring and that is capable of participating in a polymerization reaction with other carbon-carbon double bonds. Vinyl monomers have molecular weight of less than 500. Vinyl monomers include, for example, styrene, substituted styrenes, dienes, ethylene, ethylene derivatives, and mixtures thereof. Ethylene derivatives include, for example, unsubstituted and substituted versions of the following: vinyl acetate, acrylonitrile, (meth)acrylic acids, alkyl esters of (meth)acrylic acid, amides of (meth)acrylic acid, vinyl chloride, halogenated alkenes, and mixtures thereof. As used herein, "(meth)acrylic" means acrylic or methacrylic; "(meth)acrylate" means acrylate or methacrylate; and "(meth)acrylamide" means acrylamide or methacrylamide. "Substituted" means having at least one attached chemical group such as, for example, alkyl group, alkenyl group, vinyl group, hydroxyl group, carboxylic acid group, other functional groups, and combinations thereof.

An aromatic vinyl monomer is a vinyl monomer the molecule of which contains one or more aromatic ring. A vinyl monomer that is not an aromatic vinyl monomer is referred to herein as a "non-aromatic vinyl monomer." An olefin monomer is a vinyl monomer the molecule of which contains only hydrogen and carbon.

A polymer that is made by polymerizing a certain monomer, either alone or with other monomers, is said herein to include that monomer as a polymerized unit.

As used herein, a chemical group is nonionic if, when that chemical group is present in water, there is no pH condition between pH of 2.5 and a pH of 9 at which that chemical group are ionized. A chemical group is considered herein to be ionized if 50 mole percent or more of those polymerized units, based on the total moles of that chemical group, are in an ionic state. As used herein, a chemical group is ionic if, when that chemical group is present in water, there is some range of pH between pH of 2.5 and pH of 9 at which more than 50 mole percent of that chemical group is ionized.

As used herein, a monomer is nonionic if, when a polymer that contains polymerized units of that monomer is present in water, there is no pH condition between pH of 2.5 and a pH of 9 at which the polymerized units of that monomer are ionized. A polymerized unit is considered herein to be ionized if 50 mole percent or more of those polymerized units, based on the total moles of those polymerized units, are in an ionic state. As used herein, a monomer is ionic if, when a polymer that contains polymerized units of that monomer is present in water, there is some range of pH between pH of 2.5 and pH of 9 at which more than 50 mole percent of the polymerized units of that monomer are ionized.

As used herein, a "vinyl polymer" is a polymer in which 90% or more by weight, based on the weight of the polymer, is polymerized units of one or more vinyl monomer.

As used herein, a "waterborne" composition is a composition that contains water in the amount of 30% or more by weight, based on the weight of the composition. In a waterborne composition, water forms a continuous medium, and all the other ingredients are dissolved or dispersed or a combination thereof in the water.

As used herein the "solids level" of a waterborne composition is the amount of material that is left behind when a layer of the waterborne composition is applied to a substrate and then dried or allowed to dry. Solids level may be measured by making a layer of the waterborne composition that is 1 mm to 2 mm in depth in a container that is open at the top; and placing that container in a circulating-air oven at 100° C. for 30 minutes. The solids level, expressed as a percentage, is 100*(LB)/(IC), where LB is the weight of material from the waterborne composition that remains in the container after the oven exposure, and IC is the initial weight of the waterborne composition. The material from the waterborne composition that remains in the container after the oven exposure is known herein as the "solids portion" of the composition.

As used herein, an "adhesive composition" is a composition that is capable of binding together two substrates when placed in contact with both of the substrates (possibly after drying and/or heating the composition).

As used herein, a "polyol" is a compound the molecule of which contains two or more hydroxyl groups. As used herein, a "polyisocyanate" is a compound the molecule of which contains two or more isocyanate groups.

As used herein, a "water dispersible" compound is one which will form a solution or emulsion in water at 25° C. with agitation at any amount in the range 1-50%.

As used herein, a "fatty compound" is a compound the molecule of which contains one or more fatty group. A fatty group is a group that contains only carbon and hydrogen atoms and that contains 8 or more non-aromatic carbon atoms (i.e., carbon atoms that are not part of any aromatic ring). A fatty amide is a fatty compound in which one of the carbon atoms in the fatty group is bonded to an amide group. Fatty amides have the structure I:

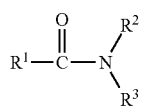

I where $R^1$ is a fatty group, and each of $R^2$ and $R^3$ is independently hydrogen or an organic group. An $R^1$ group is referred to herein as a "principal" group of a fatty amide.

The composition of the present invention is waterborne. Preferably, the amount of water in the composition is 70% or less by weight based on the weight of the composition. Preferably, the amount of water in the composition is 35% or more by weight based on the weight of the composition.

In a waterborne composition, it is useful to characterize the chemical composition of the continuous phase. In preferred compositions of the present invention, the amount of water in the continuous phase, by weight based on the weight of the continuous phase, 50% or more; more preferred is 75% or more; more preferred is 90% or more.

In preferred compositions of the present invention, the solids level is 30% or more. In preferred compositions of the present invention, the solids level is 65% or less.

The composition of the present invention contains one or more vinyl polymer. Preferred vinyl polymers contain polymerized units of one or more (meth)acrylate. A (meth) acrylate is an alkyl ester of (meth)acrylic acid; in which the alkyl group may be substituted or unsubstituted. Preferred are substituted or unsubstituted alkyl groups having 2 or more carbon atoms; more preferred is 4 or more carbon atoms. Preferred are substituted or unsubstituted alkyl groups having 20 or fewer carbon atoms; more preferred is 10 or fewer; more preferred is 8 or fewer. Among substituted alkyl groups, preferred are hydroxyalkyl groups. More preferred are unsubstituted alkyl esters of (meth)acrylic acid. More preferred are unsubstituted alkyl esters of acrylic acid.

In polymers of the present invention, the preferred amount of polymerized units of (meth)acrylates is, by weight based on the weight of the polymer, 20% or more; more preferred is 40% or more; more preferred is 50% or more. The preferred amount of polymerized units of (meth) acrylates is, by weight based on the weight of the polymer, 80% or less; more preferred is 70% or less.

Polymers that contain polymerized units of one or more (meth)acrylate optionally contain polymerized units of one or more additional vinyl monomer.

A carboxyl functional monomer is an ionic monomer that contains a carboxyl group, which may be in the nonionized state or may be in the anionic state. The carboxyl group normally remains intact during the polymerization, so that the carboxyl group is present on the polymer. The polymer of the present invention either contains no polymerized units of any carboxyl functional monomer or, if any carboxyl functional monomer is present, the amount of carboxyl functional monomer is, by weight based on the weight of the polymer, 0.4% or less. If any carboxyl monomer is present, the amount of carboxyl functional monomer, by weight based on the weight of the polymer, is preferably 0.1% or less; more preferably 0.03% or less; more preferably 0.01% or less; more preferably none.

Preferably, the polymer of the present invention contains little or no polymerized units of any ionic monomer. That is, the polymer either contains no polymerized units of any ionic monomer or, if polymerized units of any ionic monomer is present, the amount is 0.4% or less by weight of all polymerized units of all ionic monomers, based on the weight of the polymer. Preferred are polymers in which the amount of polymerized units of all ionic monomers is, by weight based on the weight of the polymer, 0.2% or less; more preferred is 0.1% or less; more preferred is 0%.

The polymer of the present invention contain polymerized units of one or more amide monomer. An amide monomer is a monomer that contains an amide group, which has structure III:

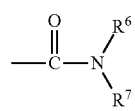

III where $R^6$ and $R^7$ is each independently hydrogen or an organic group. Preferably each of $R^6$ and $R^7$ is selected from hydrogen and alkyl groups having 3 or fewer carbon atoms.

Preferably one or both of $R^6$ and $R^7$ is hydrogen; more preferably both of $R^6$ and $R^7$ are hydrogen. Preferred amide monomers acrylamide, methacrylamide, N-substituted versions thereof, and mixtures thereof; more preferred are acrylamide and methacrylamide; more preferred is acrylamide.

When the polymer of the present invention contains polymerized units of one or more amide monomer, the preferred amount of amide monomer, by weight of all amide monomers, based on the weight of the polymer, is 10% or less; more preferably 5% or less. When the polymer of the present invention contains polymerized units of one or more amide monomer, the preferred amount of amide monomer, by weight of all amide monomers, based on the weight of the polymer, is 0.1% or more; more preferably 0.5% or more.

In such compositions, it is preferred that the amount of polymerized units of all substituted or unsubstituted amides of (meth)acrylic acid is 0.1% to 10% by weight, based on the weight of the polymer.

Preferred polymers of the present invention contain polymerized units of one or more amide monomer, one or more nonionic aromatic vinyl monomer, one or more unsubstituted alkyl ester of methacrylic acid, or a mixture thereof. More preferred polymers of the present invention contain polymerized units of one or more amide monomer and one or more nonionic aromatic vinyl monomer. When a nonionic aromatic vinyl monomer is used, preferred nonionic aromatic vinyl monomers are styrene and alkyl-substituted styrenes; more preferred are styrene and alpha-methyl styrene; more preferred is styrene. When an unsubstituted alkyl ester of methacrylic acid is used, preferred alkyl groups have 4 or fewer carbon atoms; more preferred alkyl groups have 2 or fewer carbon atoms; more preferred is methyl.

More-preferred polymers of the present invention contain polymerized units of (meth)acrylamide; one or more unsubstituted alkyl ester of acrylic acid; and either one or more nonionic aromatic vinyl monomer, one or more unsubstituted alkyl ester of methacrylic acid, or a mixture thereof. Even more preferred polymers of the present invention contain polymerized units of (meth)acrylamide; one or more unsubstituted alkyl ester of acrylic acid; and one or more nonionic aromatic vinyl monomer.

The preferred amount of nonionic aromatic monomer is, by weight based on the weight of the polymer, 5% or more; more preferred is 10% or more; more preferred is 20% or more. The preferred amount of nonionic aromatic monomer is, by weight based on the weight of the polymer, 60% or less; more preferred is 50% or less; more preferred is 40% or less.

The polymer of the present invention optionally contains polymerized units of one or more sulfonic acid functional monomer. A sulfonic acid monomer is a monomer that contains one or more sulfo radical. A sulfo radical is —SO$_2$OH, where the sulfur atom is bonded to a carbon atom. The sulfo radical may be in the nonionized state or may be in the anionic state; a compound that contains a sulfo radical is considered herein to be equivalent to an identical compound in which the sulfo radical is in the anionic state. For example, styrene sulfonic acid is considered herein to be equivalent to sodium styrene sulfonate. Preferred sulfonic acid functional monomers are sodium styrene sulfonate; 2-acrylamido-2-methyl propanesulfonic acid; sodium vinyl sulfonate, 2-sulfoethyl methacrylate, and mixtures thereof. More preferred is sodium styrene sulfonate.

When polymerized units of sulfonic acid functional monomer are present, the preferred amount of polymerized units of sulfonic acid functional monomer in the polymer of the present invention is, by weight based on the weight of the polymer, 0.1% to 10%. When polymerized units of sulfonic acid functional monomer are present, the preferred amount of sulfonic acid functional monomer is, by weight based on the weight of the polymer, preferably 0.2% or more; more preferably 0.5% or more; more preferably 1% or more. When polymerized units of sulfonic acid functional monomer are present, the preferred amount of sulfonic acid functional monomer in the polymer of the present invention is, by weight based on the weight of the polymer, preferably 7% or less; more preferably 5% or less.

The polymer of the present invention optionally contains polymerized units of one or more monomers in addition to one or more (meth)acrylate; one or more nonionic aromatic vinyl monomer; and one or more amide monomer. If one or more of such additional monomer is present, such additional monomers are preferably chosen from nonionic vinyl monomers. Preferred additional monomers are hydroxyalkyl esters of (meth)acrylic acid. Preferred hydroxyalkyl esters of (meth)acrylic acid are hydroxyethyl acrylate, hydroxyethyl methacrylate, hydroxypropyl acrylate, and hydroxypropyl methacrylate.

Preferred polymers of the present invention contain 0% to 10%, by weight based on the weight of the polymer, polymerized units of any olefin monomer. That is, preferred polymers of the present invention either contain no polymerized units of any olefin monomer or else contain, by weight based on the weight of the polymer, 10% or less polymerized units of olefin monomers. The amount of polymerized units of olefin monomer in the polymer is more preferably 0% to 5%; more preferably 0% to 2%; more preferably 0% to 1%; more preferably 0%.

It is useful to characterize a polymer of the present invention by the total amount (herein "M2"), by weight based on the weight of the polymer, of polymerized units of monomers other than one or more (meth)acrylate, one or more nonionic aromatic monomer, and one or more amide of (meth)acrylic acid. Preferably, M2 is 50% or less; more preferably 25% or less; more preferably 10% or less; more preferably 5% or less Preferred polymers contain no polymerized units of any monomer other than one or more (meth) acrylate, one or more nonionic aromatic monomer, and one or more amide of (meth)acrylic acid.

The composition of the present invention may be characterized by the polymer solids content, which is the dry weight of polymer contained in the composition, divided by the total weight of the composition, expressed as a percentage. Preferably the polymer solids content is 5% or more; more preferably 20% or more; more preferably 30% or more; more preferably 40% or more. Preferably the polymer solids content is 70% or less; more preferably 60% or less.

The Tg of the polymer of the present invention is preferably −50° C. or higher; more preferably −30° C. or higher. The Tg of the polymer of the present invention is preferably 20° C. or lower. The weight average molecular weight of the polymer of the present invention is preferably 5,000 to 2,000,000; more preferably 100,000 to 2,000,000.

Preferred polymers of the present invention are present in the form of polymer particles dispersed in water. Preferred mean particle size is from 50 nanometers to 1,000 nanometers. Preferred polymers of the present invention are formed by emulsion polymerization; the product of emulsion polymerization is a latex. Latexes contain one or more anionic surfactant, one or more nonionic surfactant, or a mixture thereof.

Preferably, in the adhesive composition of the present invention, if any polymer is present that has ionic groups attached to the polymer, the total amount of such polymers, by weight based on the total weight of the adhesive composition, is 0.5% or less; more preferably 0.1% or less; more preferably 0%.

The composition of the present invention may optionally contain one or more water dispersible polyol. If one or more polyol is used, the following polyols are preferred. Preferred polyols are polyether polyols, polyester polyols, polyester polyether polyols, or a mixture thereof. Preferred polyols are selected from diols, triols or mixtures thereof. Preferred polyol is sufficiently nonvolatile that it will be fully or at least partially available for reaction with an isocyanate during mixing operations, if an isocyanate is also present in the composition. Preferably the polyol will have a number average molecular weight from 100 to 7500, more preferably 150 to 5000, and still more preferably from 200 to 1000. Preferably, the molecular weight of the polyol is less than 1500 and still more preferably less than 600. An example of a highly preferred polyol is polypropylene glycol (PPG), such as 400 MW polypropylene glycol.

If one or more polyol is present in the composition, the preferred amount of polyol is as follows. Preferred amount of polyol is from 0.1-10% of the solid portion of the composition of the present invention. Preferably the amount of polyol is no more than 5%, more preferably no more than 3%, still more preferably no more than 2%, and most preferably no more than 1.5%. Preferably, the amount of polyol is at least 0.3%, more preferably at least 0.4%, and most preferably at least 0.6%.

The composition of the present invention may optionally be mixed with a curing composition. A curing composition contains one or more curing agent. A curing agent is a compound the molecule of which has two or more reactive groups that are capable of reacting with one or more moiety in the composition to create a polymer, to increase the molecular weight of existing polymers, and/or to produce a crosslinked network. The moiety may be the polymer of the present invention, or another moiety such as a polyol, or a combination thereof. If a curing agent is present, the preferred characteristics of that curing agent are as follows. Preferred curing agents are one or more water dispersible polyisocyanate. The polyisocyanate employed may be any suitable polyisocyanate, but preferably it is an aliphatic polyisocyanate, an aromatic polyisocyanate or a mixture thereof. Preferably, the polyisocyanate is a diisocyanate. Examples of suitable polyisocyanates include those based on toluene diisocyanate (TDI), isophorone diisocyanate (IPDI), hexamethylene diisocyanate (HDI), diphenyl methane diisocyanate (MDI), dicyclohexyl methane diisocyanate (HMDI), isomers thereof or mixtures thereof. Prepolymers of a polyisocyanate and a polyol may also be employed. Aliphatic polyisocyanates are especially preferred.

If one or more polyisocyanate is used, the amount of polyisocyanate is preferably determined as follows. The relative proportions of isocyanate groups to isocyanate-reactive groups may vary as desired, within a molar ratio of NCO/NCO-reactive groups of 1:1 to 8:1. NCO-reactive groups include, e.g., hydroxyl, amino and carboxyl groups. Preferably, the NCO/NCO-reactive group molar ratio is at least 3:1. Preferably, the NCO/NCO-reactive group molar ratio is no more than 5:1.

The pH of the resulting overall mixture preferably is 5 to 9 and more preferably is 6 to 8.

Embodiments are envisioned in which the composition of the present invention does not include any polyol. Also envisioned are embodiments in which the composition of the present invention does not include any polyisocyanate. Also envisioned are embodiments in which the composition of the present invention contains neither polyol nor polyisocyanate. Preferred are embodiments that include one or more polyisocyanate.

It is contemplated that, when practicing embodiments in which one or more polyisocyanate is used, the polyisocyanate will be added to the composition a relatively short time before the composition of the present invention is to be put into use as an adhesive composition. Preferably, the time between forming a single composition that contains both polyisocyanate and the polymeric moiety with which the polyisocyanate is capable of reacting and the step of contacting that composition with the surface of a substrate is 48 hours or less; more preferably 24 hours or less; more preferably 12 hours or less; more preferably 8 hours or less.

Other optional components of the compositions of the present invention include, but are not limited to, agents selected from co-solvents, coalescing agents, pigments or other colorants, fillers, reinforcement (e.g., fibers), dispersants, wetting agents, waxes, catalysts, blowing agents, anti-foam agent, UV absorbers, flame retardants, adhesion promoters, antioxidants, biocides, coalescing agents, or stabilizers. These optional components (as desired) may be added in any order of addition that does not cause an incompatibility between components. Components that do not dissolve in the aqueous carrier (such as pigments and fillers) can be dispersed in the waterborne composition or an aqueous carrier or co-solvent using a mixer (optionally a high shear mixer). The pH of the composition can be adjusted by adding acid or base, with agitation. Examples of base include, but are not limited to ammonia, diethylamine, triethylamine, dimethyl-ethanolamine, triethanolamine, sodium hydroxide, potassium hydroxide, and sodium acetate. Examples of acids include, but are not limited to, acetic acid, formic acid, hydrochloric acid, nitric acid, and toluene sulfonic acid.

Preferred compositions of the present invention either contain no fatty compound or else contain a total amount of all fatty compounds that is 0.5% or less. More preferred total amount of all fatty compounds is 0% to 0.1%; more preferred is 0%.

The compositions of the present invention can be applied to desired substrates using conventional application techniques such as rotogravure printing, flexographic printing, conventional or airless spray, roll coating, brush coating, wire wound rod coating, knife coating, or coating processes such as curtain-, flood-, bell-, disc-, and dip-coating processes. Coating with the adhesive composition may be done over an entire surface or only a portion of it, such as along an edge, or at intermittent locations. Once applied to the substrate, the compositions are dried, such as by application of heat and air flow, or some other suitable approach for removing substantially all remaining water.

The adhesive compositions of the present invention may find other suitable application as top coats, or other intermediate coats, thus rendering them potentially useful in paints, inks, plastics, or the like. The adhesive compositions of the present invention can be used on a wide variety of one or a plurality of suitable substrates.

Suitable substrates include, for example, polymers, paper, wood and reconstituted wood products, polymer coated substrates, wax coated paperboard, cardboard, particle board, textiles, leather, and metal (for example, aluminum foil), and metallized plastics.

Preferably, one or more substrate is a polymer. Preferred polymers are polyolefins, polystyrene, polyvinyl chloride, polyacrylates, polyethers, polyamides, polyesters, polyurethanes, polysulfones, polyphenylenes, copolymers thereof, and blends thereof. The category of polyolefins includes homopolymers of olefin monomers such as ethylene, propylene, and butylene and also includes copolymers of olefin monomers with other monomers such as acrylic monomers (such as methyl acrylate), vinyl esters (such as vinyl acetate), and mixtures thereof. Such polymers are considered to include polymers blended with various additives including, for example, impact modifiers, processing aids, lubricants, slip agents, stabilizers, other additives, and mixtures thereof. More preferred are polyolefins, polyesters, and polyamides; more preferred are polyolefins; more preferred are homopolymers of olefin monomers. Among homopolymers of olefin monomers, preferred are polyethylenes; more preferred are low density polyethylenes, including low density polyethylene (LDPE), linear low density polyethylene (LLDPE), and metallocene-catalyzed linear low density polyethylene (mLLDPE). Preferably, one or more substrate is a polymer that contains a slip agent.

Substrates may have any shape or form. Preferred substrates are films. Films are objects that have one dimension that is 250 micrometer (10 mil) or less. The surface of a film that is perpendicular to the smallest dimension is herein called the "face" of the film. A preferred use of the composition of the present invention is lamination (i.e., formation of a laminate). A laminate is formed when the face of one film is bonded to the face of another film. The two films may have the same composition as each other or they may be of different compositions.

Though wet lamination processes are possible, preferably the adhesive composition is particularly useful for dry bond lamination of a plurality of substrates, where each substrate is a film. In a preferred embodiment, a layer of the adhesive composition is applied to a face of a first substrate film, water is removed (e.g., with heated air or otherwise), and the resulting layer of dried adhesive composition is covered with a face of a second substrate film to form a laminated article wherein the two substrate films are bonded together by the dried layer of adhesive composition. In a preferred embodiment, the substrate layers are provided in the form of rolls of substrate material. Preferred sheets are 12 micrometer to 250 micrometer (0.5 to 10 mil) in thickness; more preferred sheets are 12 micrometer to 250 micrometer (0.5 to 5 mil). Larger thicknesses are also possible, as are smaller thicknesses (e.g., 1 or more micrometer).

At least one substrate contains one or more slip agent. A slip agent is a composition that reduces the coefficient of friction of a substrate when it is added to that substrate. Preferred are slip agents that reduce the coefficient of friction of polymer films. Preferred slip agents are siloxanes, including organomodified siloxanes, and fatty compounds. Preferred are fatty compounds. More preferred are fatty amides, which have structure I defined above. In the $R^1$ groups of preferred fatty amides, the number of non-aromatic carbon atoms is 12 or more; more preferably 16 or more. In the $R^1$ groups of preferred fatty amides, the number of non-aromatic carbon atoms is 28 or fewer; more preferably 24 or fewer. Preferred $R^1$ groups are linear. Preferred $R^1$ groups are stearyl, oleyl, and erucyl. $R^3$ is preferably hydrogen. $R^2$ is preferably hydrogen or a fatty group having 16 to 18 carbon atoms or structure II:

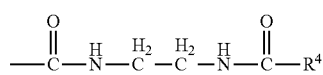

where $R^4$ is an organic group. $R^4$ is preferably chosen from the same compositions that are preferred for $R^1$. When $R^2$ has structure II, it is preferred that $R^1$ and $R^4$ are identical. Among fatty amides, preferred are stearamide, erucamide, oleamide, ethylene bis-stearamide, ethylene bis-oleamide, and mixtures thereof; more preferred are oleamide, erucamide, and mixtures thereof.

Preferably, the waterborne adhesive composition of the present invention contains little or no fatty amide. That is, the waterborne adhesive composition of the present invention either contains no fatty amide or, if any fatty amide is present, the amount of fatty amide, by weight based on the weight of the waterborne adhesive composition, is 0.1% or less. The amount of fatty amide in the waterborne adhesive composition of the present invention is more preferably 0.03% or less; more preferably 0.01% or less; more preferably 0%. Preferably, the waterborne adhesive composition of the present invention contains little or no slip agent. That is, the waterborne adhesive composition of the present invention either contains no slip agent or, if any slip agent is present, the amount of slip agent, by weight based on the weight of the waterborne adhesive composition, is 0.1% or less. The amount of slip agent in the waterborne adhesive composition of the present invention is more preferably 0.03% or less; more preferably 0.01% or less; more preferably 0%.

The following are examples of the present invention.

EXAMPLE 1

Preparation of polymers and laminates. Each of the polymers described in the present examples was made by conventional emulsion polymerization to produce a waterborne latex. Total weight of monomers was 300 grams. A sample of 100 grams of latex was mixed with 2 grams of water dispersible hexamethylene diisocyanate to form an adhesive composition, and the mixture was applied to the face of a polyethylene terephthalate film and dried. The amount of dried adhesive composition was 2.44 grams per square meter (1.5 lb/ream). The layer of dried adhesive composition was brought into contact with the face of a commercial film of low density polyethylene that contained a slip aid (which was considered to be either erucamide or oleamide) to form a laminate.

The laminate was stored at ambient conditions (approximately 25° C.) for one week, and the coefficient of friction (COF) was measured. The laminate was then placed in an oven at 50° C. for 1 day to mimic the heat that normally occurs during manufacturing. The laminate was then stored at ambient conditions for 1 day. The COF was measured again after 1 day at ambient conditions.

The amount of each monomer is characterized below by parts by weight (pbw).

Comparative Polymer CP1 had 60 pbw butyl acrylate (BA), 38 pbw styrene (Sty), and 2 pbw acrylic acid (AA).

Example Polymer EP1 had 60 pbw BA, 38 pbw Sty, and 2 pbw acrylamide (AM).

Example Polymer EP2 had 60.5 pbw BA, 37.75 pbw Sty, 1.5 pbw AM, and 0.25 pbw sodium styrene sulfonate (NaSS).

EXAMPLE 2

The COF results were as follows. After 1-day oven treatment and then 1-day ambient storage, the COF of the laminate made using the comparative polymer rose to an undesirably high level, while the COF of the laminates made using the example polymers remained at an acceptable level.

| Sample | COF before oven | COF after 1-day oven and 1-day ambient |
|--------|-----------------|----------------------------------------|
| CP1    | 0.26            | 0.32                                   |
| EP1    | 0.15            | 0.18                                   |
| EP2    | 0.08            | 0.24                                   |

The invention claimed is:

1. A method of bonding a first substrate to a second substrate, wherein said method comprises
    (a) providing a dispersion of vinyl polymer particles dispersed in water, wherein the vinyl polymer comprises
        (ii) 0.1% to 10% polymerized units of amide monomer, by weight based on the weight of said vinyl polymer,
        (iii) polymerized units of one or more unsubstituted alkyl esters of (meth)acrylic acid, and
        (iv) polymerized units of one or more nonionic aromatic monomer selected from the group consisting of styrene and alkyl-substituted styrenes;
        wherein said vinyl polymer comprises no polymerized units of any monomer other than (ii), (iii), and (iv);
    (b) providing a water dispersible polyisocyanate;
    (c) forming a waterborne adhesive composition that consists of said dispersion of vinyl polymer particles and said water dispersible polyisocyanate, and optionally one or more of co-solvents, coalescing agents, pigments, colorants, fillers, fibers, dispersants, wetting agents, waxes, catalysts, blowing agents, anti-foam agents, UV absorbers, flame retardants, antioxidants, biocides, acids, or bases;
        wherein said waterborne adhesive composition either comprises no polymer that has ionic groups or else comprises polymers having ionic groups in a total amount of 0.1% or less by weight based on the total weight of said waterborne adhesive composition;
    (d) applying a layer of said waterborne adhesive composition to a surface of said first substrate;
    (e) drying said layer of a waterborne adhesive composition to remove water, and
    (f) contacting a surface of said second substrate to said layer,
    wherein one or both of said first substrate and said second substrate comprises one or more slip agent.

2. The method of claim 1 wherein said first substrate or said second substrate is a polymer film that comprises one or more slip agent.

3. The method of claim 2 wherein said slip agent is a fatty amide.

4. The method of claim 1 wherein said first substrate or said second substrate is a polymer film that comprises low density polyethylene and that comprises one or more fatty amide.

5. The method of claim 1, wherein said amide monomer is acrylamide.

6. A bonded article formed by the method of claim 1.

7. The bonded article of claim 6, wherein said first substrate or said second substrate is a polymer film that comprises low density polyethylene and that comprises one or more fatty amide.

8. The method of claim 1, wherein said one or more (meth)acrylate monomers are present in an amount of 40% to 80% based on the weight of the vinyl polymer.

9. The method of claim 1, wherein said one or more (meth)acrylate monomers are present in an amount of 20% to 80% based on the weight of the vinyl polymer.

10. The method of claim 1, wherein said one or more nonionic aromatic monomer selected from the group consisting of styrene and alkyl-substituted styrenes are present in an amount of 5% to 60% based on the weight of the vinyl polymer.

11. The method of claim 1, wherein said one or more nonionic aromatic monomer selected from the group consisting of styrene and alkyl-substituted styrenes are present in an amount of 10% to 60% based on the weight of the vinyl polymer.

12. The method of claim 11, wherein said one or more (meth)acrylate monomers are present in an amount of 20% to 80% based on the weight of the vinyl polymer.

* * * * *